US008797959B2

(12) United States Patent
Razaviyayn et al.

(10) Patent No.: US 8,797,959 B2
(45) Date of Patent: Aug. 5, 2014

(54) SYSTEM AND METHOD FOR TRANSCEIVER DESIGN

(75) Inventors: Meisam Razaviyayn, Minneapolis, MN (US); Mohammadhadi Baligh, Ottawa (CA); Aaron Callard, Ottawa (CA); Zhi-Quan Luo, Maple Grove, MN (US)

(73) Assignee: Futurewei Technologies, Inc., Plano, TX (US)

( * ) Notice: Subject to any disclaimer, the term of this patent is extended or adjusted under 35 U.S.C. 154(b) by 121 days.

(21) Appl. No.: 13/342,769

(22) Filed: Jan. 3, 2012

(65) Prior Publication Data

US 2012/0170442 A1 Jul. 5, 2012

Related U.S. Application Data

(60) Provisional application No. 61/430,093, filed on Jan. 5, 2011.

(51) Int. Cl.
*H04W 24/00* (2009.01)

(52) U.S. Cl.
USPC .......................................................... 370/328

(58) Field of Classification Search
USPC .............. 370/328, 329, 330, 335, 412; 455/7, 455/450, 452.2; 375/240.16, 267
See application file for complete search history.

(56) References Cited

U.S. PATENT DOCUMENTS

| 2005/0207491 | A1* | 9/2005 | Zhang et al. | 375/240.16 |
|---|---|---|---|---|
| 2006/0238268 | A1* | 10/2006 | Kwun et al. | 333/20 |
| 2007/0064830 | A1* | 3/2007 | Choi et al. | 375/267 |
| 2007/0286303 | A1* | 12/2007 | Yamaura | 375/267 |
| 2009/0047901 | A1* | 2/2009 | Yu et al. | 455/7 |
| 2009/0135944 | A1* | 5/2009 | Dyer et al. | 375/267 |
| 2009/0221231 | A1* | 9/2009 | Weng et al. | 455/15 |
| 2010/0008331 | A1* | 1/2010 | Li et al. | 370/335 |
| 2010/0041408 | A1* | 2/2010 | Caire et al. | 455/446 |
| 2010/0309854 | A1* | 12/2010 | Wu et al. | 370/329 |
| 2011/0003599 | A1* | 1/2011 | Kanzaki et al. | 455/452.2 |
| 2011/0070918 | A1* | 3/2011 | Hafeez | 455/522 |
| 2011/0211547 | A1* | 9/2011 | Kim et al. | 370/329 |
| 2012/0002612 | A1* | 1/2012 | Baker et al. | 370/328 |
| 2012/0294258 | A1* | 11/2012 | Ray et al. | 370/329 |

OTHER PUBLICATIONS

Christensen, S.S., et al., "Weighted Sum-Rate Maximization using Weighted MMSE for MIMO-BC Beamforming Design," IEEE Transactions on Wireless Communications, vol. 7, No. 12, Dec. 2008, pp. 4792-4799.

Ding, M., et al., "MIMO Minimum Total MSE Transceiver Design With Imperfect CSI at Both Ends," IEEE Transactions on Signal Processing, vol. 57, No. 3, Mar. 2009, pp. 1141-1150.

(Continued)

*Primary Examiner* — Anh-Vu Ly
*Assistant Examiner* — Gustavo Lopez-Vargas
(74) *Attorney, Agent, or Firm* — Slater & Matsil, L.L.P.

(57) ABSTRACT

A method for operating a controller of a multiple input, multiple output communications system includes formulating an objective function according to a resource allocation for a user equipment (UE) and a mean square error expression, and updating the objective function to generate an updated resource allocation for the UE, a transmit beamforming vector to precode a transmission to the UE, and a receive beamforming vector to adjust a receiver to receive the precoded transmission. The method also includes transmitting allocation information about the resource allocation for the UE and the transmit beamforming vector to a communications controller serving the UE.

26 Claims, 8 Drawing Sheets

(56) References Cited

OTHER PUBLICATIONS

Gomadam, K., et al., "Approaching the Capacity of Wireless Networks through Distributed Interference Alignment," IEEE, Dec. 2008, pp. 1-10.

Ho, Z. K. M., et al., "Balancing Egoism and Altruism on the single beam MIMO Interference Channel," IEEE Transactions on Signal Processing, Oct. 7, 2010, pp. 1-10.

Huang, J., et al., "Distributed Interference Compensation for Wireless Networks," IEEE Journal on Selected Areas in Communications, vol. 24, No. 5, May 2006, pp. 1074-1084.

Jorswieck, E. A., et al., "The MISO Interference Channel From a Game-Theoretic Perspective: A Combination of Selfishness and Altruism Achieves Pareto Optimality," IEEE, 2008, pp. 5364-5367.

Kim, S-J, et al., "Optimal Resource Allocation for MIMO Ad Hoc Cognitive Radio Networks," Forty-Sixth Annual Allerton Conference, IEEE, Sep. 23-26, 2008, pp. 39-45.

Larsson, E. G., et al., "Competition Versus Cooperation on the MISO Interference Channel," IEEE Journal on Selected Areas in Communications, vol. 26, No. 7, Sep. 2008, pp. 1059-1069.

Luo, Z-Q., et al., "Analysis of Iterative Waterfilling Algorithm for Multiuser Power Control in Digital Subscriber Lines," EURASIP Journal on Applied Signal Processing, vol. 2006, Article ID 24012, 11 pages.

Luo, Z-Q., et al., "Dynamic Spectrum Management: Complexity and Duality," IEEE Journal of Selected Topics in Signal Processing, vol. 2, No. 1, Feb. 2008, pp. 57-73.

Medard, M., "The Effect upon Channel Capacity in Wireless Communications of Perfect and Imperfect Knowledge of the Channel," IEEE Transactions on Information Theory, vol. 46, No. 3, May 2000, pp. 933-946.

Razaviyayn, M., et al., "Linear Transceiver Design for Interference Alignment: Complexity and Computation," IEEE, Jun. 2010, 5 pages.

Schmidt, D. A., et al., "Minimum Mean Squared Error Interference Alignment," IEEE, 2009, pp. 1106-1110.

Scutari, G., et al., "The MIMO Iterative Waterfilling Algorithm," IEEE Transactions on Signal Processing, vol. 57, No. 5, May 2009, pp. 1917-1935.

Serbetli, S., et al., "MMSE Transmitter Design for Correlated MIMO Systems with Imperfect Channel Estimates: Power Allocation Trade-offs," IEEE Transactions on Wireless Communications, vol. 5, No. 8, Aug. 2006, pp. 2295-2304.

Shi, C., et al., "Distributed Interference Pricing with MISO Channels," Forty-Sixth Annual Allerton Conference, Sep. 23-26, 2008, pp. 539-546.

Shi, C., et al., "Local Interference Pricing for Distributed Beamforming in MIMO Networks," IEEE, paper ID# 900688, 2009, pp. 1-6.

Shi, C., et al., "Monotonic Convergence of Distributed Interference Pricing in Wireless Networks," IEEE, Jun. 2009, 5 pages.

Shi, Q., et al., "An Iteratively Weighted MMSE Approach to Distributed Sum-Utility Maximization for a MIMO Interfering Broadcast Channel," IEEE Transactions on Signal Processing, vol. 59, No. 9, Sep. 2011, pp. 4331-4340.

Shiu, D-S., et al. "Fading Correlation and Its Effect on the Capacity of Multielement Antenna Systems," IEEE Transactions on Communications, vol. 48, No. 3, Mar. 2000, pp. 502-513.

Tresch, R., et al., "Cellular Interference Alignment with Imperfect Channel Knowledge," IEEE, 2009, 5 pages.

Ye, S., et al., "Optimized Signaling for MIMO Interference Systems With Feedback," IEEE Transactions on Signal Processing, vol. 51, No. 11, Nov. 2003, pp. 2839-2848.

\* cited by examiner

SYSTEM AND METHOD FOR TRANSCEIVER DESIGN

This application claims the benefit of U.S. Provisional Application No. 61/430,093, filed on Jan. 5, 2011, entitled "Transceiver in a MIMO Communication System," which application is hereby incorporated herein by reference.

TECHNICAL FIELD

The present invention relates generally to digital communications, and more particularly to a system and method for transceiver design.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA), and the like. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

Some wireless communication systems use multiple-input multiple-output (MIMO) techniques that use multi-output transmitters and multiple-input receivers to enhance system performance. In such cases, transmitted data is precoded into multiple outputs.

SUMMARY OF THE INVENTION

Example embodiments of the present invention which provide a system and method for transceiver design.

In accordance with an example embodiment of the present invention, a method for operating a controller of a multiple input, multiple output communications system is provided. The method includes formulating an objective function according to a resource allocation for a user equipment (UE) and a mean square error expression. The method also includes updating the objective function to generate an updated resource allocation for the UE, a transmit beamforming vector to precode a transmission to the UE, and a receive beamforming vector to adjust a receiver to receive the precoded transmission. The method further includes transmitting allocation information about the updated resource allocation for the UE and the transmit beamforming vector to a communications controller serving the UE.

In accordance with another example embodiment of the present invention, a method for operating a user equipment is provided. The method includes estimating a received signal at the user equipment, and determining a receive beamforming vector from the estimated received signal. The method also includes updating a weighting matrix according to the receive beamforming vector, and transmitting feedback information including the receive beamforming vector and the updated weighting matrix to a network element serving the user equipment.

In accordance with another example embodiment of the present invention, a method for operating a communications controller is provided. The method includes receiving feedback information including receive beamforming vectors and weighting matrices from a plurality of user equipments, and determining a transmit beamforming vector for a scheduled user equipment in the plurality of user equipments, the determining according to the feedback information. The method also includes transmitting information precoded with the transmit beamforming vector to the scheduled user equipment.

In accordance with another example embodiment of the present invention, a controller is provided. The controller includes a processor, and a transmitter operatively coupled to the processor. The processor formulates an objective function according to a resource allocation for a user equipment (UE) and a mean square error expression, and updates the objective function to generate an updated resource allocation for the UE, a transmit beamforming vector to precode a transmission to the UE, and a receive beamforming vector to adjust a receiver to receive the precoded transmission. The transmitter transmits allocation information about the updated resource allocation for the UE and the transmit beamforming vector to a communications controller serving the UE.

In accordance with another example embodiment of the present invention, a user equipment is provided. The user equipment includes a processor, and a transmitter operatively coupled to the processor. The processor estimates a received signal at the user equipment, to determine a receive beamforming vector from the estimated received signal, and updates a weighting matrix according to the receive beamforming vector. The transmitter transmits feedback information including the receive beamforming vector and the updated weighting matrix to a communications controller serving the user equipment One advantage of an embodiment is that a technique that combines joint user scheduling with design for transmit and/or receive beamforming vectors that can maximize communications system utility is provided. The beamforming vector design occurs in situations with the presence of both inter-cell and intra-cell interference. A system utility that aims to attain a suitable trade-off between user fairness and overall communications system utility by considering joint user scheduling and/or grouping, power allocation, and beamforming vector design is presented.

A further advantage of an embodiment is that the technique combining joint user scheduling with design for transmit and/or receive beamforming vectors and/or transmit power allocation is implementable as a distributed algorithm, which helps to speed up the design as well as reduce the computational load on single entity otherwise responsible for joint user scheduling with beamforming vector design.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to user scheduling and beamforming design for transmitters and receivers of a multiple input, multiple output (MIMO) communications system. For example, in a centralized approach, an entity implements an optimization technique to solve the problem of designing transmitter and/or receiver beamforming vectors, scheduling users, as well as transmit power allocation to maximize communications system performance with the technique designing the transmitter and/or receiver beamforming vectors as well as scheduling users simultaneously. A block coordinate descent algorithm is used in the optimization (e.g., minimization) of the problem, and hence, performs user scheduling, beamforming design for transmitters and receivers, and/or transmits power allocation. As another example, in a distributed approach, a technique performed at a user equipment designs receiver beamforming vectors, while a technique performed at a communications controller designs transmitter beamforming vectors, schedules users, and/or allocates transmit power to maximize communications system performance.

The present invention will be described with respect to example embodiments in a specific context, namely a communications system that is compliant with a technical standard, such as a Third Generation Partnership Project (3GPP) Long Term Evolution (LTE) standard, an IEEE 802.16m standard, a WiMAX standard, and the like, supporting MIMO operation. The invention may also be applied, however, to non-standards compliant communications systems supporting MIMO operation.

Figure 1:
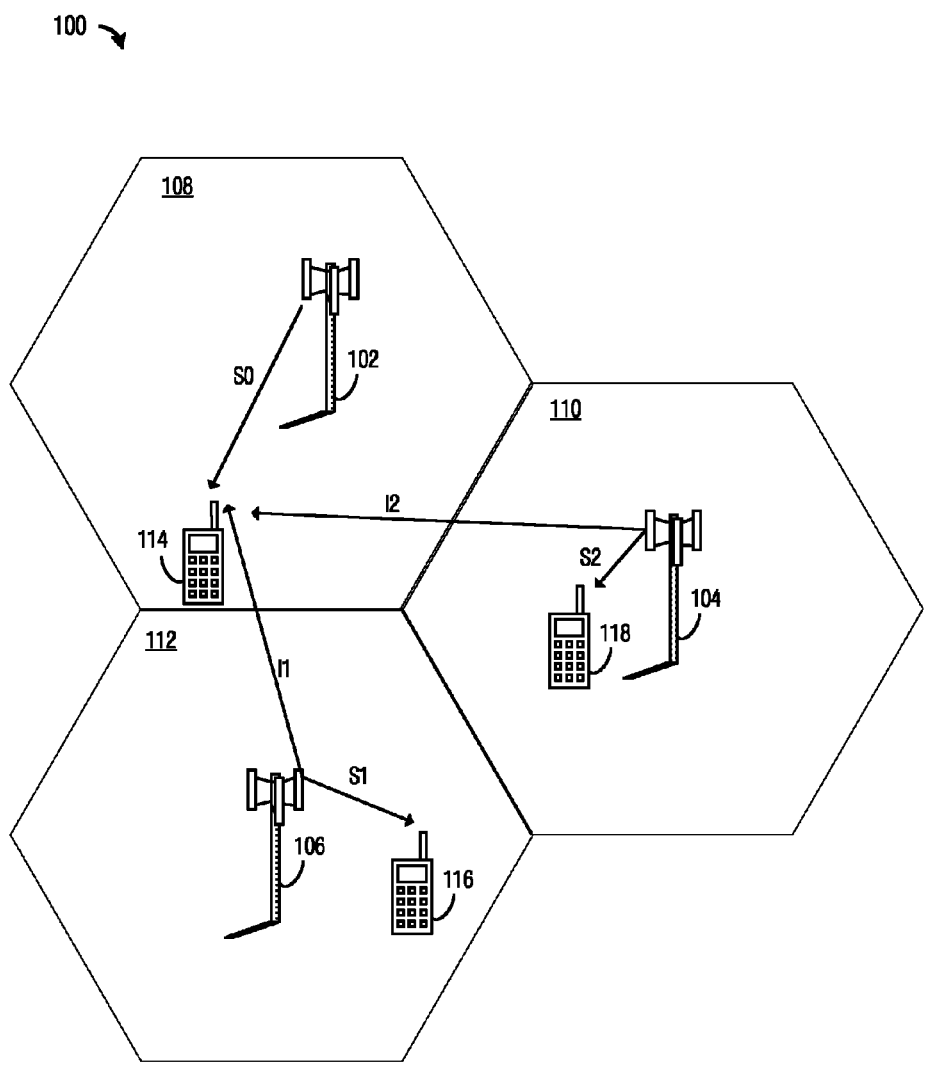
FIG. 1 illustrates an example communications system according to example embodiments described herein.

FIG. 1 illustrates a communications system 100. Communications system 100 is divided into cells 108, 110 and 112, where each cell 108, 110 and 112 has corresponding base station 102, 104 and 106. Mobile terminals or user equipment (UE) 114 and 116 access communications system 100 through one of evolved NodeBs (eNB) 102, 104 and 106. Three eNBs 102, 104 and 104 and two UEs 114 and 116 are used for simplicity of illustration, however, multiple eNBs (as well as cells) and UEs can be used and provided for in real systems. A UE is also commonly referred to as a mobile station, a user, a subscriber, a terminal, and the like, while an eNB is also commonly referred to as a base station, controller, communications controller, and the like.

In an embodiment, eNB 102 in cell 108 transmits with a power S0 to UE 114 in a downlink channel. eNB 106 in cell 112 transmits to UE 116 with a power S1, which appears to UE 114 as interference signal I1. Similarly, eNB 104 in cell 110 transmits to UE 118 with a power S2, which appears to UE 114 as interference signal I2.

Figure 2:
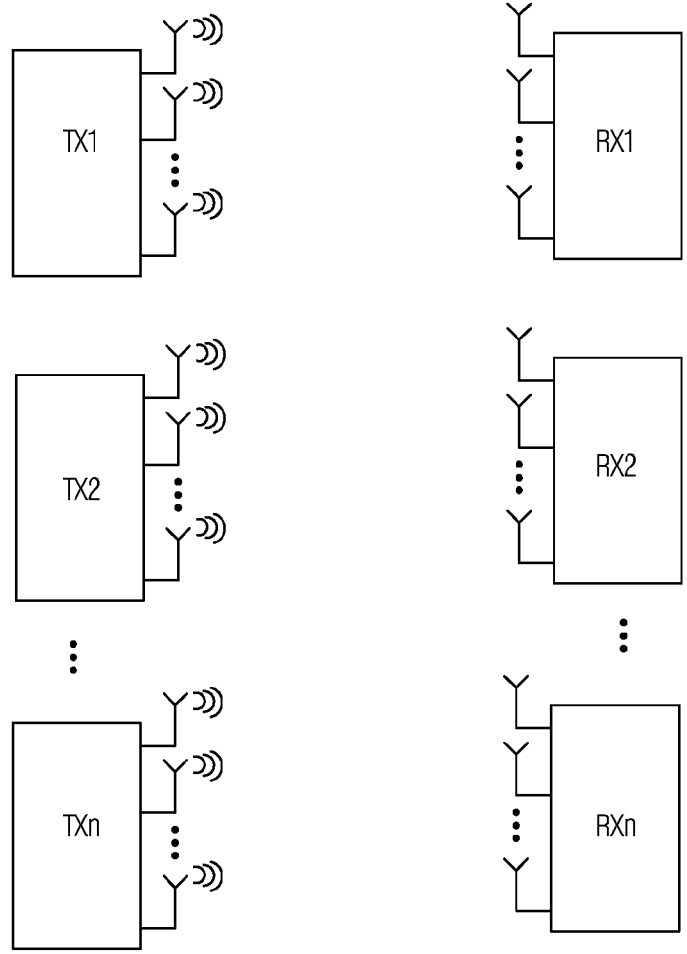
FIG. 2 illustrates an example communications system that supports MIMO operation according to example embodiments described herein.

FIG. 2 illustrates a communications system 200 that supports MIMO operation. Communications system 200 has a plurality of transmitters TX1, TX2 to TXn and a plurality of receivers RX1, RX2 to RXn. In an example embodiment, any number of transmitters and any number of receivers can be present in communications system 200. Each transmitter TX1, TX2 to TXn and each receiver RX1, RX2 to RXn has a plurality of antennas. In embodiment communications system 200 illustrated in FIG. 2, spatial diversity, using, for example, beam forming techniques, is used to improve system performance. In alternative example embodiments, other MIMO schemes can be used, for example, time diversity and channel diversity using multiple tones, time slots, or a combination thereof.

Although the discussion focuses on transmitters and/or receivers with multiple transmit antenna and/or multiple receive antenna, the example embodiments presented herein are also operable with transmitters and/or receivers with a single transmit antenna and/or a single receive antenna. Therefore, the discussion of multiple transmit antennas and multiple receive antennas should not be construed as being limiting to either the scope or the spirit of the example embodiments.

Figure 3A:
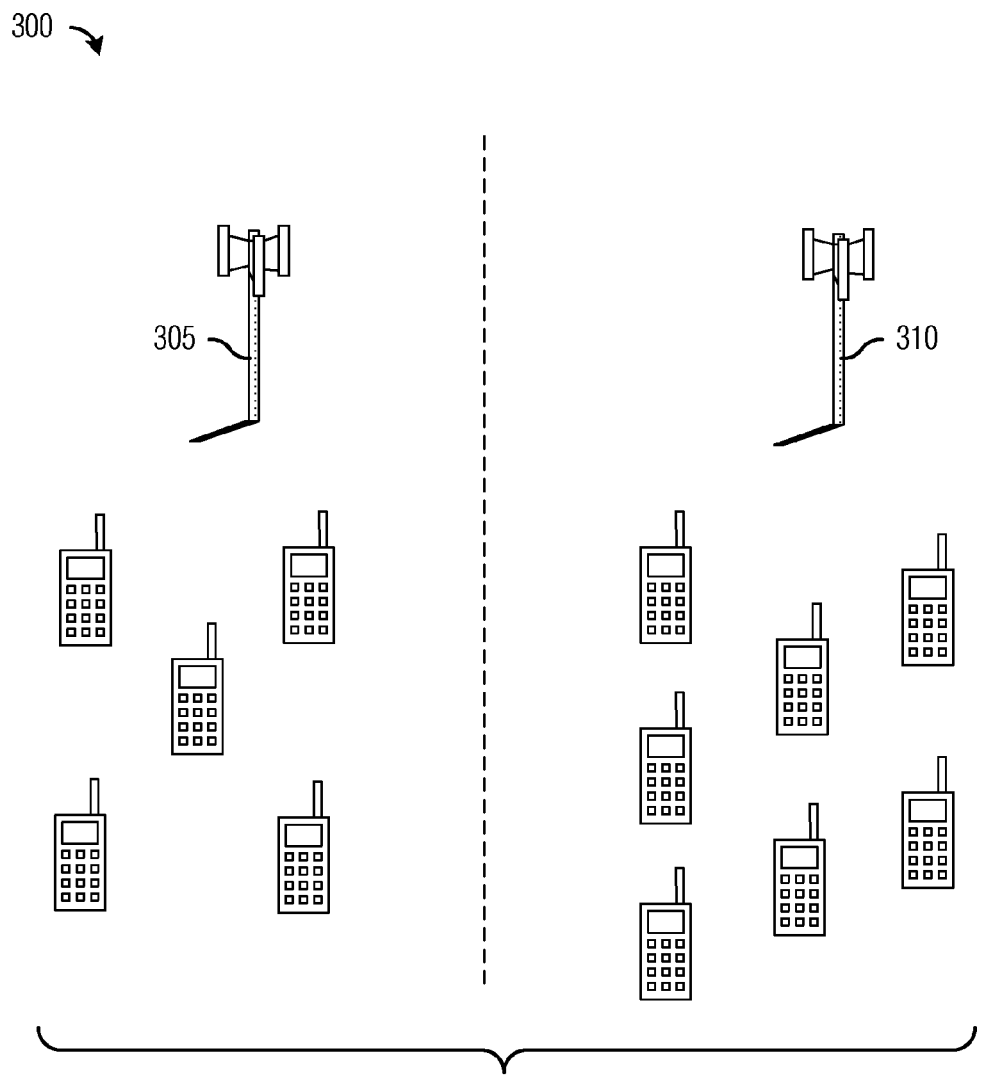
FIG. 3a illustrates an example communications system supporting a plurality of UEs according to example embodiments described herein.

FIG. 3a illustrates a communications system 300 supporting a plurality of UEs. As shown in FIG. 3a, eNB 305 supports a first plurality of UEs in its cell and eNB 310 supports a second plurality of UEs in its cell. Simply scheduling each of the UEs in the first plurality of UEs and in the second plurality of UEs may result in each UE not receiving a sufficient amount of bandwidth to meet their respective service requirements. Furthermore, the utilization of available bandwidth may lead to intolerable intra-cell and inter-cell interference. As an example, without planning, transmissions made by eNB 305 may interfere with transmissions made by eNB 310 and vice versa.

Figure 3B:
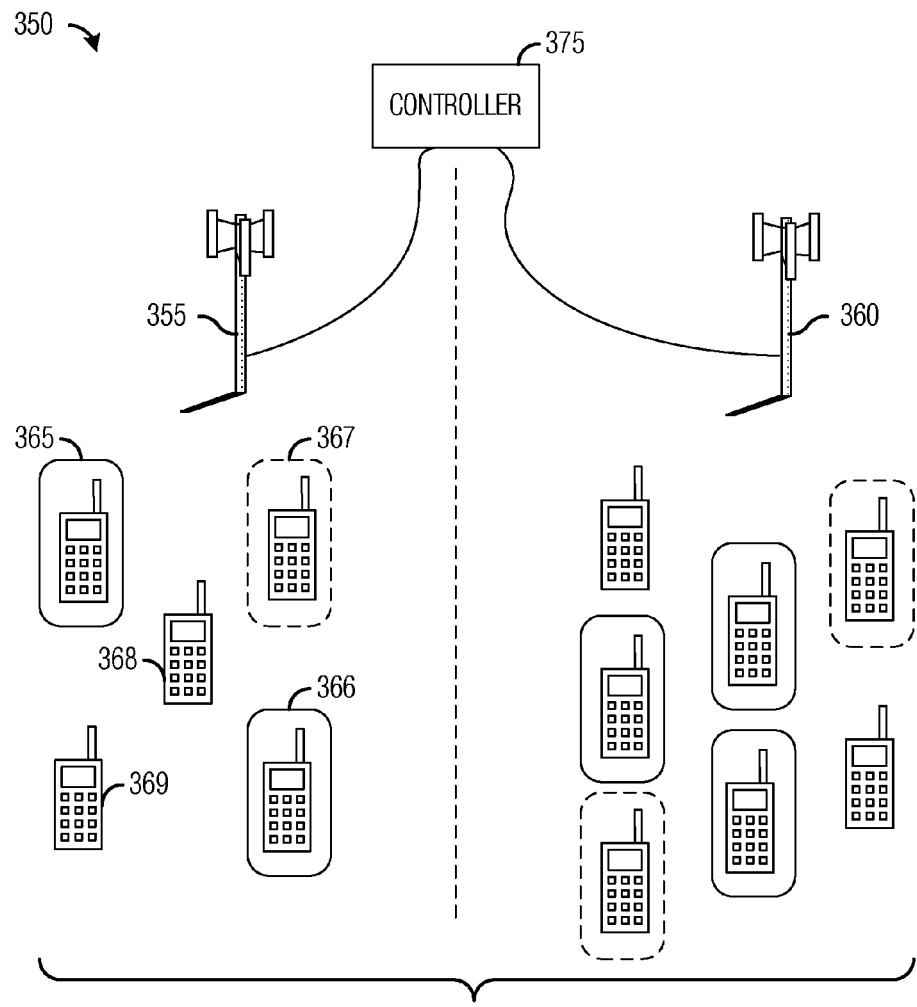
FIG. 3b illustrates an example communications system supporting a plurality of UEs with planning to help reduce intra-cell and inter-cell interference, as well as increase available bandwidth to the UEs according to example embodiments described herein.

FIG. 3b illustrates a communications system 350 supporting a plurality of UEs with planning to help reduce intra-cell and inter-cell interference, as well as increase available bandwidth to the UEs. Rather than transmitting to every UE operating within its respective cell, an eNB, such as eNB 355 and eNB 360, may partition the UEs into groups. According to an example embodiment, the partitioning of the UEs may be based on spatial and/or temporal criteria. Considering a plurality of UEs served by eNB 355 as an example, the plurality of UEs served by eNB 355 is partitioned into three different groups. The groups are shown in FIG. 3b as UEs highlighted with a solid rounded box (e.g., UE 365 and UE 366), UEs highlighted with a dashed rounded box (e.g., UE 367), and un-highlighted UEs (e.g., UE 368 and UE 369). Available bandwidth of eNB 355 may be partitioned and allocated for the UEs.

A controller 375 may be used to partition the UEs, partition the available bandwidth, allocate the partitions of the available bandwidth, schedule UEs, compute transmit beamforming vectors, compute receive beamforming vectors, and the like, in an example embodiment. According to an alternative example embodiment, the eNBs (e.g., eNB 355 and eNB 360) may partition the UEs, partition the available bandwidth, allocate the partitions of the available bandwidth, schedule UEs, compute transmit beamforming vectors, compute receive beamforming vectors, and the like. The eNBs may receive assistance from the UEs that they are serving, with the UEs computing receive beamforming vectors and feeding the information back to the eNBs, for example.

According to an example embodiment, controller 375 serves the entirety of the communications system. According to an alternative example embodiment, controller 375 serves a portion of the communications system, such as a subset of eNBs of the communications system and their associated UEs. There may be multiple controllers like controller 375 serving different portions of the communications system, with each portion of the communications system potentially comprising a different number of eNBs and associated UEs. According to another alternative example embodiment, controller 375 serves a single eNB of the communications system and its associated UEs. There may be multiple controllers like controller 375 serving different eNBs.

As an example, with three different groups of UEs, the available bandwidth of eNB 355 may be partitioned into three parts not necessarily equal with each part assigned to a UE group. The available bandwidth may be partitioned in a frequency domain, a time domain, or a combination thereof, and used in such a manner as to reduce intra-cell interference. The available bandwidth of eNB 360 may also be similarly partitioned. Utilization of the available bandwidth of eNB 355 and eNB 360 may be arranged to reduce inter-cell interference.

The use of beamforming to provide a direction to a transmission is a commonly used technique to help reduce interference to UE not operating in the general vicinity of the direction of the beam. Information to be transmitted is precoded with a beamforming vector to shape the transmission and then transmitted using an antenna array. Beamforming can be used at both the transmitter (e.g., an eNB) and the receiver (e.g., a UE). However, when an eNB is serving a large number of UE, the task of scheduling UEs and designing beamforming vectors for the scheduled UEs may be a difficult and computationally intensive task.

Consider a K-cell communications system with an interfering broadcast channel where an eNB k, k=1, 2, ..., K, is equipped with $M_k$ transmit antennas and serves $I_k$ UE in cell k. Let $i_k$ denote the i-th receiver in cell k and $N_{ik}$ (denote the number of antennas at receiver $i_k$. Furthermore, let I be the set of all UEs, i.e., $$I = \{i_k | 1 \le k \le K, 1 \le i \le I_k\}.$$

Assume that the UEs are grouped into G groups and different groups are served in an orthogonal manner. In this way, when an eNB serves the UEs in one group, it causes no interference to the UEs in other groups. As an example, the G groups may represent different time slots so that the users in group g, g=1, 2, ..., G, are served in the time slot g or frequency tone. To keep the decoding and encoding process simple, it is assumed that there is no correlated signaling across different groups. Under these assumptions and considering a linear channel model between the transceivers, the received signal of UE $i_k$ in group (or time slot) g can be expressed as $$y_{i_k}^g = \underbrace{H_{i_k k} x_{i_k}^g}_{desired\ signal} + \underbrace{\sum_{\ell \ne i, \ell=1}^{I_k} H_{i_k k} x_{\ell_k}^g}_{intracell\ interference} + \underbrace{\sum_{j \ne k, j=1}^{K} \sum_{\ell=1}^{I_j} H_{i_k j} x_{\ell_j}^g}_{intercell\ interference\ plus\ noise} + n_{i_k}^g,$$

$$\forall i_k \in I,$$

where $X_{i_k}^g \in C^{M_k \times 1}$ and $y_{i_k}^g \in C^{N_{ik} \times 1}$ are the transmitted signal and the received signal of UE $i_k$ while it is served in group g, respectively, and C may represent real or complex domain values. The matrix $H_{i,j} \in C^{N_{ik} \times M_j}$ represents the channel response from the transmitter j to receiver $i_k$, while $n_{i_k}^g \in C^{N_{ik} \times 1}$ denotes the complex additive white Gaussian noise with distribution $CN(0, \sigma_{i_k g}^2 I)$. It is assumed that the signals of different UEs are independent of each other, as well as the noise. Moreover, a restriction is made to limit to only linear beamforming strategies where base station k deploys a beamforming vector $V_{i_k}^g \in C^{M_k \times d_{ik}}$ to modulate the data stream of UE $i_k$ in group g, while user $i_k$ estimates the transmitted signal in group g using a linear beamforming matrix $U_{i_k}^g \in C^{N_{ik} \times d_{ik}}$. That is, $$x_{i_k}^g = V_{i_k}^g s_{i_k}^g, \hat{s}_{i_k}^g = U_{i_k}^{g H} y_{i_k}^g,$$

where $s_{i_k} \in C^{d_{ik} \times 1}$ is the data vector of UE $i_k$ with a normalized power $$E[s_{i_k} s_{i_k}^H] = I,$$

and $x^H$ represents a complex conjugate transpose of X. Then, treating interference as noise, the rate of UE $i_k$ in group g is expressible as $$R_{i_k}^g = \log\det\left(I + H_{i_k k} V_{i_k}^g (V_{i_k}^g)^H H_{i_k k}^H \left(\sigma_{i_k}^2 I + \sum_{(j,\ell) \ne (k,i)} H_{i_k j} V_{\ell_j}^g (V_{\ell_j}^g)^H H_{i_k j}^H \right)^{-1}\right).$$

Let $\beta_g$ denote the fraction of the resources allocated to the UEs in group g. As an example, if different UEs are served in different time slots (i.e., the communications is using time division multiple access (TDMA)), then $\beta_g$ denotes the fraction of time that is allocated to the UEs in group g. Similarly, if the communications is using frequency division multiple access (FDMA), then $\beta_g$ denotes the fraction of frequency that is allocated to the UEs in group g. With an appropriate normalization, it can be assumed that $$\sum_{g=1}^{G} \beta_g = 1.$$

Under these assumptions, the rate of UE $i_k$ is the weighted sum of the rates that the UE can get in each group, i.e., $$R_{i_k} = \sum_{g=1}^{G} \beta_g R_{i_k}^g.$$

Employing a system utility function U(•), a joint user grouping and transmitter and/or receiver design problem may be expressible as $$\max_{\beta,V} \mathcal{U}\left(\{R_{i_k}\}_{i_k \in I}\right) \quad (1)$$

$$\text{s.t.} \sum_{i=1}^{I_k} Tr\left(V_{i_k}^g V_{i_k}^{gH}\right) \leq P_k,$$

$$\forall k \in \mathcal{K}, \forall g \in \mathcal{G}$$

$$\sum_{g=1}^{G} \beta_g = 1$$

$$\beta_g \geq 0, \forall g \in \mathcal{G}.$$

In applications, the utility function U(•) can usually be decomposed as the sum of utilities of individual UEs. In these scenarios, the optimization problem shown in Expression (1) can be rewritten as $$\max_{V,\beta} \sum_{k=1}^{K} \sum_{i=1}^{I_k} u_{i_k}\left(\sum_{g=1}^{G} \beta_g R_{i_k}^g\right) \quad (2)$$

$$\text{s.t.} \sum_{i=1}^{I_k} Tr\left(V_{i_k}^g V_{i_k}^{gH}\right) \leq P_k,$$

$$\forall k \in \mathcal{K}, \forall g \in \mathcal{G}$$

$$\sum_{g=1}^{G} \beta_g = 1$$

$$\beta_g \geq 0, \forall g \in \mathcal{G}.$$

According to an example embodiment, in a scenario where there is a single group, G=1, it is possible to drop the notation g for simplicity. In such a situation, Expression (2) simplifies to $$\max_{\{V_{i_k}\}_{i_k \in I}} \sum_{k=1}^{K} \sum_{i=1}^{I_k} u_{i_k}(R_{i_k}) \quad (3)$$

$$\text{s.t.} \sum_{i=1}^{I_k} Tr\left(V_{i_k} V_{i_k}^H\right) \leq P_k, \forall k \in \mathcal{K}.$$

Considering the function $$f_{i_k}(U_{i_k}) = \log \det(E_{i_k}^{-1}),$$

where $E_{i_k}$ is a mean square error (MSE) matrix (a MSE expression), i.e., $$E_{i_k} \triangleq \mathbb{E}_{s,n}[(\hat{s}_{i_k} - s_{i_k})(\hat{s}_{i_k} - s_{i_k})^H]$$

$$= (I - U_{i_k}^H H_{i_k k} V_{i_k})(I - U_{i_k}^H H_{i_k k} V_{i_k})^H +$$

$$\sum_{(\ell,j) \neq (i,k)} U_{i_k}^H H_{i_k j} V_{\ell_j} V_{\ell_j}^H H_{i_k j}^H U_{i_k} + \sigma_{i_k}^2 U_{i_k}^H U_{i_k},$$

where $\mathbb{E}(\cdot)$ is an expected value operator. $E_{i_k}$ may be referred to as a mean square error form of a received signal at UE $i_k$.

By take the derivative of $f_{i_k}(U_{i_k})$ with respect to U and checking a first order optimality condition, it is possible to express the rate of UE $i_k$ as $$\max_{U_{i_k}} f_{i_k}(U_{i_k}) = \quad (4)$$

$$\log \det\left(I + H_{i_k k} V_{i_k}(V_{i_k})^H H_{i_k k}^H \left(\sigma_{i_k}^2 I + \sum_{(j,\ell) \neq (k,i)} H_{i_k j} V_{\ell_j}(V_{\ell_j})^H H_{i_k j}^H\right)^{-1}\right).$$

Therefore, assuming that $u_{i_k}(\cdot)$ is an increasing function of it is possible to express the optimization problem shown in Expression (3) as $$\min_{V,U} \sum_{k=1}^{K} \sum_{i=1}^{I_k} c_{i_k}(E_{i_k}) \quad (5)$$

$$\text{s.t.} \sum_{i=1}^{I_k} Tr\left(V_{i_k} V_{i_k}^H\right) \leq P_k, \forall k \in \mathcal{K},$$

where $c_{i_k}(E_{i_k}) = -u_{i_k}(-\log \det(E_{i_k}))$ is the cost function of UE $i_k$. It is noted that $c_{i_k}(E_{i_k}) = -u_{i_k}(-\log \det(E_{i_k}))$ may also be referred to as an objective function. It is now possible to introduce auxiliary weight matrix variables $\{W_{i_k}\}$ and define a matrix-weighted sum-MSE minimization problem as $$\max_{V,U,W} \sum_{k=1}^{K} \sum_{i=1}^{I_k} \left(Tr(W_{i_k}^H E_{i_k}) + c_{i_k}^*(\gamma_{i_k}(W_{i_k})) - Tr(W_{i_k}^H \gamma_{i_k}(W_{i_k}))\right) \quad (6)$$

$$\text{s.t.} \sum_{i=1}^{I_k} Tr\left(V_{i_k} V_{i_k}^H\right) \leq P_k, \forall k \in \mathcal{K}$$

where $\gamma_{i_k}(\cdot): \mathbb{R}^{d_{i_k} \times d_{i_k}} \mapsto \mathbb{R}^{d_{i_k} \times d_{i_k}}$ is the inverse mapping of gradient map $\nabla c_{i_k}(E_{i_k})$.

It can be shown that if $c_{i_k}(\cdot) = -u_{i_k}(-\log \det(\cdot))$ is a strictly concave function for all $i_k$ and that $u_{i_k}$ is an increasing function of $R_{i_k}$, then the inverse gradient map $\gamma_{i_k}(\cdot)$ is well defined, and for any fixed transmit and/or receive beamforming vectors $\{V, U\}$, an optimal weight matrix $W_{i_k}$ for Expression (6) is expressible as $W_{i_k}^{opt} = \nabla c_{i_k}(E_{i_k})$. Additionally, the sum-utility maximization problem (Expression (3)) is equivalent to the matrix sum-MSE minimization problem (Expression (6)) in the sense that V* is a local and/or global optimal solution of Expression (3) if and only if there exists (U*, W*) which together with V* forms a local and/or global optimal solution of Expression (6)).

According to an example embodiment, weighted sum-rate maximization problems, weighted sum signal plus interference to noise ratio (SINR) maximizations, geometric mean maximization of one plus rates, and the like, are examples of utility functions that satisfy the above conditions. Therefore, it is possible to solve Expression (6) rather than Expression (3). As an example, a block coordinate descent algorithm may be used to solve Expression (6). It can be shown that by fixing $\{V_{i_k}, W_{i_k}\}_{i_k \in I}$, the optimum $U_{i_k}$ is expressible as $$U_{i_k}^{opt} = J_{i_k}^{-1} H_{i_k k} V_{i_k}, \forall i_k \in \mathcal{I},$$

where $$J_{i_k} \triangleq \sum_{(j,l)} H_{i_k j} V_{l_j} V_{l_j}^H H_{i_k j}^H + \sigma_{i_k}^2 I$$

is the received signal covariance matrix at UE $i_k$. Furthermore, if $\{W_{i_k}, U_{i_k}\}_{i_k \in I}$ by checking the first order optimality condition of the Lagrange function, the following is obtained $$V_{i_k}^{opt} = \left(\sum_{(j,l)} H_{j l k}^H U_{l_j} W_{l_j} U_{l_j}^H H_{l j k} + \mu_k^* I\right)^{-1} H_{i_k k}^H U_{i_k} W_{i_k},$$

$$\forall i_k \in \mathcal{I},$$

where $\mu_k^*$ is an optimal Lagrange multiplier which may be found using one directional search algorithms (e.g., a bisection algorithm and the like). Additionally, it can be shown that any stationary point of Expression (6) is a stationary point of Expression (5). Therefore, the coordinate descent algorithm (e.g., a weighted minimum mean square error (WMMSE) algorithm) converges to a stationary point of Expression (5).

According town example embodiment, a pseudo-code implementation of the block coordinate descent algorithm when G=1, referred to herein as example implementation one, is as follows:

initialize $V_{i_k}$'s randomly such that $$Tr(V_{i_k} V_{i_k}^H) = \frac{p_k}{I_k}$$

repeat $$U_{i_k} \leftarrow \left(\sum_{(j,l)} H_{i_k j} V_{l_j} V_{l_j}^H H_{i_k j}^H + \sigma_{i_k}^2 I\right)^{-1} H_{i_k k} V_{i_k}, \forall i_k$$

$$W_{i_k} \leftarrow \nabla c_{i_k}(E_{i_k}), \forall i_k$$

$$V_{i_k} \leftarrow \left(\sum_{(j,l)} H_{j l k}^H U_{l_j} W_{l_j} U_{l_j}^H H_{l j k} + \mu_k^* I\right)^{-1} H_{i_k k}^H U_{i_k} W_{i_k}, \forall i_k$$

until convergence
It is noted that $$Tr(V_{i_k} V_{i_k}^H) = \frac{p_k}{I_k}$$

is an illustrative example of an initialization of the $V_{ik}$'s and that other initializations for the $V_{ik}$'s are possible as long as a constraint on transmit power is not violated. It is further noted that rather than a convergence criteria, the block coordinate descent algorithm may be always repeated in the channel or it may be repeated only when a change in channel values is detected.

According to an example embodiment, in a scenario where there are multiple groups G and a fraction of resources allocated to each group is fixed, i.e., $\beta_g = 1/G$, $\forall$ g, a goal in developing a joint user grouping and beamforming vector design technique may be to maximize the utility of the communications system while considering fairness in the communications system. More specifically, it may be desirable to solve the following optimization problem $$\max_V \sum_{k=1}^K \sum_{i=1}^{I_k} u_{i_k}\left(\sum_{g=1}^G \frac{1}{G} R_{i_k}^g\right) \quad (7)$$

$$\text{s.t.} \sum_{i=1}^{I_k} Tr(V_{i_k}^g V_{i_k}^{gH}) \leq P_k, \forall k \in K, \forall g \in \mathcal{G}.$$

Let $E_{i_k}^g$ denote the MMSE of UE $i_k$ when it is served in group g. Similar to Expression (4), it is possible to express the weighted sum of the rates as $$R_{i_k} = \sum_{g=1}^G \frac{1}{G} R_{i_k}^g$$

$$= \max_U - \sum_{g=1}^G \beta_g \log\det(E_{i_k}^g).$$

Assuming that $u_{i_k}(\cdot)$ is an increasing function of $R_{i_k}$, it may be possible to rewrite Expression (7) as $$\max_{U,V} \sum_{k=1}^K \sum_{i=1}^{I_k} u_{i_k}\left(-\sum_{g=1}^G \frac{1}{G} \log\det E_{i_k}^g\right) \quad (8)$$

$$\text{s.t.} \sum_{i=1}^{I_k} Tr(V_{i_k}^g V_{i_k}^{gH}) \leq P_k, \forall k \in K, \forall g \in \mathcal{G}.$$

The optimization problem $$\min_{\{x_i\}_{i=1}^n} \sum_{i=1}^n f_i(x_i) \quad (9)$$

$$\text{s.t.} (x_1, x_2, \ldots, x_n) \in \mathbb{X},$$

is equivalent to $$\min_{\{x_i, y_i\}_{i=1}^n} \sum_{i=1}^n (y_i^H x_i + f_i(\phi_i(y_i)) - y_i^H \phi_i(y_i)) \quad (10)$$

$$\text{s.t.} (x_1, x_2, \ldots, x_n) \in \mathbb{X},$$

if $f_i: \mathbb{C} \mapsto \mathbb{R}$, i=1, 2, . . . , n, is strictly concave and twice continuously differentiable functions, where $\Phi_i(\cdot): \mathbb{C}^{m_i} \mapsto \mathbb{C}^{m_i}$ is the inverse map of the gradient map $\nabla f_{i_k}(\cdot)$. Additionally, the objective function of Expression (10) is convex with respect to each $y_i$.

Assuming that $$c_{i_k} = -u_{i_k}\left(-\sum_{g=1}^{G}\frac{1}{G}\text{logdet}(E_{i_k}^g)\right)$$

is strictly concave in $$E_{i_k} \triangleq (E_{i_k}^1, E_{i_k}^2, \ldots, E_{i_k}^G).$$

Then Expression (8) can be re-expressed as $$\min_{U,V,W}\sum_{k=1}^{K}\sum_{i=1}^{l_k}[Tr(W_{i_k}E_{i_k}) + c_{i_k}(\gamma_{i_k}(W_{i_k})) - Tr(W_{i_k}\gamma_{i_k}(W_{i_k}))] \quad (11)$$

$$\text{s.t.} \sum_{i=1}^{l_k}Tr(V_{i_k}^g V_{i_k}^{gH}) \leq P_k, \forall k \in K, \forall g \in \mathcal{G},$$

where $\gamma_{i_k}(\bullet)$ is the inverse map of the gradient map $\nabla E_{i_k}c_{i_k}(\bullet)$, and $Tr(W_{i_k}E_{i_k}) + c_{i_k}(\gamma_{i_k}(W_{i_k})) - Tr(W_{i_k}\gamma_{i_k}(W_{i_k}))$ is referred to as a cost function or an objective function. It is noted that $V_{i_k}^g$ represents the resource allocation for UE $i_k$ in group g. Therefore, if $V_{i_k}^g = 0$, then UE $i_k$ is not scheduled.

The block coordinate descent approach may be used to solve Expression (11). If $\{U_{i_k}, V_{i_k}\}_{i_k \in I}$ is fixed, the optimal $W_{i_k}$ is given by $\nabla c_{i_k}(\bullet)$. Alternatively, if $\{W_{i_k}\}_{i_k \in I}$ is fixed, then may be necessary to minimize $Tr(W_{i_k}E_{i_k})$, i.e., it is necessary to solve the following weighted sum MSE minimization problem $$\min_{U,V}\sum_{k=1}^{K}\sum_{i=1}^{l_k}\sum_{g=1}^{G}Tr(W_{i_k}^g E_{i_k}^g) \quad (12)$$

$$\text{s.t.} \sum_{i=1}^{l_k}Tr(V_{i_k}^g V_{i_k}^{gH}) \leq P_k, \forall k \in K, \forall g \in G,$$

where $W_{i_k}^g \in C^{d_{ik} \times d_{ik}}$ is part of $W_{i_k}$ which corresponds to $E_{i_k}^g$, and $Tr(W_{i_k}^g E_{i_k}^g)$ is referred to as a cost function or an objective function. It is noted that Expression (12) may be decomposable across eNBs and groups.

According to an example embodiment, a pseudo-code of the block coordinate descent algorithm with no time or frequency allocation (i.e., $\beta_g$ is fixed), referred to herein as example implementation two, is as follows:

initialize $V_{i_k}^g$'s randomly such that $$Tr\left(V_{i_k}^g V_{i_k}^{gH}\right) = \frac{p_k}{I_k}$$

repeat $$U_{i_k}^g \leftarrow (\Sigma_{(j,l)}H_{ikj}V_{lj}^g V_{lj}^{gH}H_{ikj}^H + \sigma_{i_k}^2 I)^{-1}H_{ikk}V_{i_k}^g, \forall i_k \in \mathcal{I}, \forall g \in \mathcal{G}$$

$$W_{i_k}^g \leftarrow \nabla E_{i_k}^g c_{i_k}(\bullet), \forall i_k \in \mathcal{I}, \forall g \in \mathcal{G},$$

$$V_{i_k}^g \Delta(\Sigma_{(j,l)}H_{ljk}^H U_{lj}^g W_{lj}^g U_{lj}^{gH}H_{ljk} + \mu^*_k I)^{-1}H_{ikk}^H U_{i_k}^g W_{i_k}^g, \forall i_k \in \mathcal{I}, \forall g \in \mathcal{G}$$

until convergence

It is noted that rather than a convergence criteria, the block coordinate descent algorithm may be always repeated in the channel or it may be repeated only when a change in channel values is detected. Furthermore, it may not be necessary to complete an entire iteration of the block coordinate descent algorithm. As an example, the block coordinate descent algorithm may be stopped after the receive beam forming vectors are updated and previously updated weighting vectors matrix and transmit beam forming vectors may be used.

According to an example embodiment, in a scenario where there are multiple groups G and a fraction of resources allocated to each group is not fixed, i.e., $\{\beta_g\}_{g=1}^G$ is an additional optimization variable, the joint user grouping and beamforming vector design technique may become an optimization problem expressible as $$\max_{V,\beta}\sum_{k=1}^{K}\sum_{i=1}^{l_k}u_{i_k}\left(\sum_{g=1}^{G}\beta_g R_{i_k}^g\right) \quad (13)$$

$$\text{s.t.} \sum_{i=1}^{l_k}Tr(V_{i_k}^g V_{i_k}^{gH}) \leq P_k, \forall k \in K, \forall g \in \mathcal{G}$$

$$\sum_{g=1}^{G}\beta_g = 1$$

$$\beta_g \geq 0, \forall g \in \mathcal{G}.$$

Again, assume that $u_{i_k}(\bullet)$ is an increasing function of $R_{i_k}$. Then, similar to Expression (5), it is possible to rewrite Expression (13) as the following equivalent optimization problem $$\min_{U,V,\beta}\sum_{k=1}^{K}\sum_{i=1}^{l_k}c_{i_k}(\beta, E_{i_k}) \quad (14)$$

$$\text{s.t.} \sum_{i=1}^{l_k}Tr(V_{i_k}^g V_{i_k}^{gH}) \leq P_k, \forall k \in K, \forall g \in \mathcal{G}$$

$$\sum_{g=1}^{G}\beta_g = 1$$

$$\beta_g \geq 0, \forall g \in \mathcal{G},$$

where $$c_{i_k}(\beta, E_{i_k}) = -u_{i_k}\left(-\sum_{g=1}^{G}\beta_g \text{logdet}(E_{i_k}^g)\right)$$

and is referred to as a cost function or an objective function.

According to an example embodiment, it is possible to update the value of $\beta_g$ while optimizing Expression (14) by solving $$\min_{\beta} \sum_{k=1}^{K} \sum_{i=1}^{I_k} c_{i_k}(\beta, E_{i_k}) \quad (15)$$

$$\text{s.t.} \sum_{g=1}^{G} \beta_g = 1$$

$$\beta_g \geq 0, \forall g \in \mathcal{G}.$$

It is noted that when $u_{i_k}(\bullet)$ is concave for all $i_k \in I$, e.g., $u_{i_k} = \log(R_{i_k})$ which represents a proportional fairness utility function, the objective function is convex and the above problem (Expression (15)) can be solved efficiently. Additionally, Expression (15) does not require knowledge of channel coefficients and therefore may be solved in a centralized manner, in a media access control (MAC) layer, as an example.

According to an example embodiment, a pseudo-code of the block coordinate descent algorithm with $\beta$ as a design variable, referred to herein as example implementation three, is as follows:

initialize $V_{i_k}^g$'s randomly such that $$Tr(V_{i_k}^g V_{i_k}^{gH}) = \frac{p_k}{I_k}$$

initialize $\beta$ with $$\beta_g = \frac{1}{G},$$

∀ g
repeat $W_{i_k}^g \leftarrow \nabla E_{i_k}^g c_{i_k}(\bullet), \forall i_k \in \mathcal{I}, \forall g \in \mathcal{G}$ $U_{i_k}^g \leftarrow (\Sigma_{(j,l)} H_{i_k j} V_{l_j}^g V_{l_j}^{gH} H_{i_k j}^H + \sigma_{i_k}^2 I)^{-1} H_{i_k k} V_{i_k}^g \forall i_k \in \mathcal{I}, \forall g \in \mathcal{G}$ $W_{i_k}^g \leftarrow \nabla E_{i_k}^g c_{i_k}(\bullet), \forall i_k \in \mathcal{I}, \forall g \in \mathcal{G}$ $V_{i_k}^g \leftarrow (\Sigma_{(j,l)} H_{ljk}^H U_{l_j}^g W_{l_j}^g U_{l_j}^{gH} H_{ljk} + \mu^*_k I)^{-1} H_{i_k k}^H U_{i_k}^g W_{i_k}^g, \forall i_k \in \mathcal{I}, \forall g \in \mathcal{G}$ update $\{\beta_g\}_{g=1}^{G}$ by solving (17)
until convergence It is noted that rather than a convergence criteria, the block coordinate descent algorithm may be always repeated in the channel or it may be repeated only when a change in channel values is detected. Furthermore, it may not be necessary to complete an entire iteration of the block coordinate descent algorithm. As an example, the block coordinate descent algorithm may be stopped after the receive beam forming vectors are updated and previously updated weighting vectors matrix and transmit beam forming vectors may be used. It is also noted that other initializations for $\beta$ are also possible.

According to an example embodiment, the block coordinate descent algorithm (e.g., the implementation one, the implementation two, and the implementation three) may be implemented in a centralized manner. For example, the block coordinate descent algorithm may be implemented in a controller, such as controller 375 of FIG. 3b, to perform joint user grouping and beamforming vector design.

Figure 4:
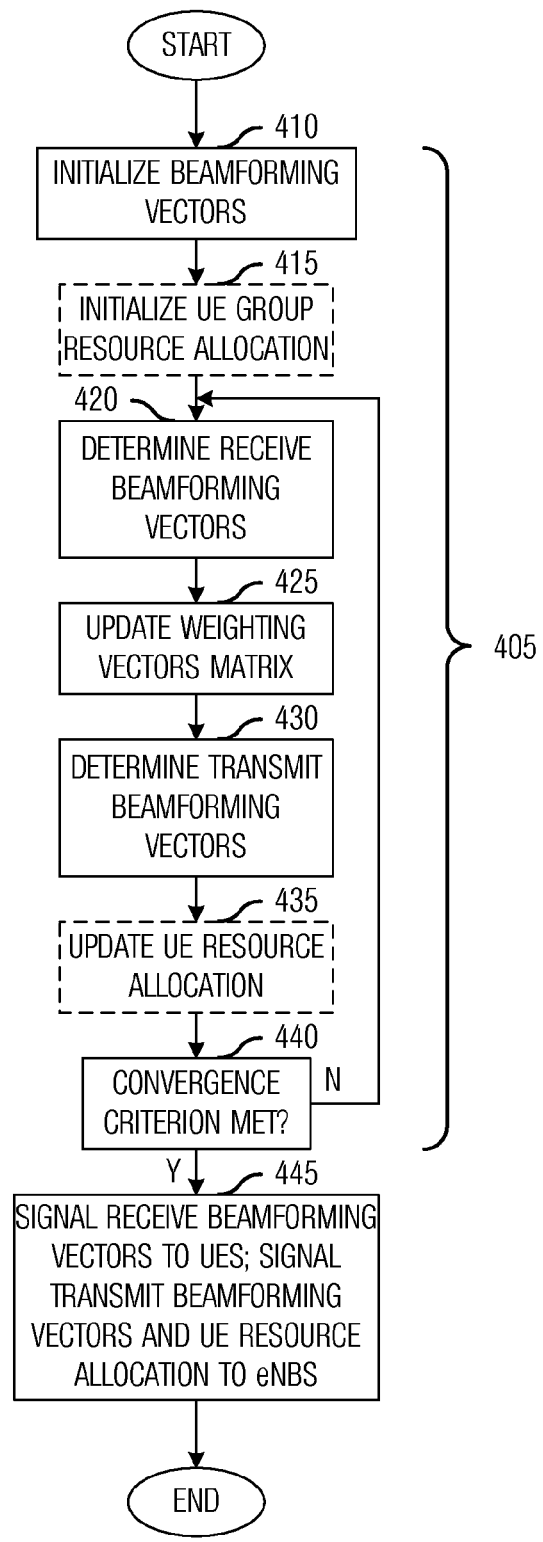
FIG. 4 illustrates an example flow diagram of operations in transmitting to UEs, wherein an algorithm to perform joint user grouping and beamforming vector design is implemented in a centralized manner according to example embodiments described herein.

FIG. 4 illustrates a flow diagram of operations 400 in transmitting to UEs, wherein an algorithm to perform joint user grouping and beamforming vector design is implemented in a centralized manner. Operations 400 may be indicative of operations occurring in a controller, such as controller 375 of FIG. 3b, of a communications system that is responsible for performing joint user grouping and beamforming vector design.

According to an example embodiment, operations 400 implements the block coordinate descent algorithm (e.g., the example implementation one, the example implementation two, and the example implementation three) to perform joint user grouping, beamforming vector design, and/or transmit power allocation. As an example, depending on group configuration and resource allocation, the joint user grouping, beamforming vector design, and/or transmit power allocation may be implemented using a corresponding block coordinate descent algorithm to solve a matrix-weighted sum-MSE minimization problem, such as Expression (14) for a scenario with multiple groups G and a changeable fraction of resources allocated to each group, Expression (11) for a scenario with multiple groups G and a fixed fraction of resources allocated to each group, or Expression (5) for a scenario with a single group.

Operations 400 may begin with the controller solving the matrix-weighted sum-MSE minimization problem, where the matrix-weighted sum-MSE minimization problem being solved depends upon parameters of the communications system (shown collectively as blocks 405). According to an example embodiment, the solving of the matrix-weighted sum-MSE minimization problem may be achieved by updating an objective function. As an example, if the communications system uses only a single group of UEs, then the controller solves the matrix-weighted sum-MSE minimization problem shown in Expression (5), if the communications system uses multiple UE groups with fixed resource allocation per group, then the controller solves the matrix-weighted sum-MSE minimization problem shown in Expression (11), while if the communications system uses multiple UE groups with changeable resource allocations per group, then the controller solves the matrix-weighted sum-MSE minimization problem shown in Expression (14).

According to an example embodiment, the controller may solve the matrix-weighted sum-MSE minimization problem using a block coordinate descent algorithm. As discussed above, the matrix-weighted sum-MSE minimization problem solved by the controller depends upon the parameters of the communications system. As an example, the number of UE groups and an ability to change the allocation of available resources impact which matrix-weighted sum-MSE minimization problem that is solved by the controller.

The controller may begin with an initialization of beamforming vectors (block 410). According to an example embodiment, the beamforming vectors initialized depends on the parameters of the communications system. As an example, if the communications system supports a single group of UEs, then the controller initializes transmit beamforming vectors $V_{i_k}$ in a random fashion so that $$Tr(V_{i_k} V_{i_k}^H) = \frac{p_k}{I_k}.$$

According to an example embodiment, other ways of initializing the transmit beamforming vectors are possible, including random initialization. As an example, it may be possible to initialize the transmit beamforming vectors using single value decomposition (SVD) precoding of the channel and the like. If the communications system uses multiple UE groups with fixed resource allocation per group, then the controller initializes transmit beamforming vectors $V_{i_k}^g$ in a random fashion so that $$Tr\left(V_{i_k}^g V_{i_k}^{g^H}\right) = \frac{p_k}{I_k}.$$

While if the communications system uses multiple UE groups with changeable resource allocations per group, then the controller initializes transmit beamforming vectors $V_{i_k}^g$ in a random fashion so that $$Tr\left(V_{i_k}^g V_{i_k}^{g^H}\right) = \frac{p_k}{I_k}.$$

Additionally, if the communications system uses multiple UE groups with changeable resource allocations per group, then the controller also initializes β as $$\beta_g = \frac{1}{G},$$

∀ g (block 415). According to an example embodiment, other ways of initializing β are possible. As an example, if it is known a priori that there are poor quality UE, then it may be possible to allocate a large portion of resources to the poor quality UE.

The controller may then determine receive beamforming vectors (block 420). The receive beamforming vectors may be determined based on the channel response, the transmit beamforming vectors (e.g., either the initialized transmit beamforming vectors or transmit beamforming vectors determined in an earlier iteration in an iterative implementation of the block coordinate descent algorithm), noise (e.g., either from intra-cell transmissions or from inter-cell transmissions), and the like. The determination of the receive beamforming vectors, along with other vectors and matrices as described herein, makes use of widely known linear algebra techniques. According to an example embodiment, the controller may determine the receive beamforming vectors for each of the scheduled UEs, which is generally a subset of served UEs. As with the initialization of the transmit beamforming vectors, the determination of the receive beamforming vectors may depend upon the parameters of the communications system. As an example, if the communications system uses only a single group of UEs, then the controller determines the receive beamforming vectors by evaluating $$U_{i_k} \leftarrow (\Sigma_{(j,l)} H_{i_k j} V_{l_j} V_{l_j}^H H_{i_k j}^H + \sigma_{i_k}^2 I)^{-1} H_{i_k k} V_{i_k}, \forall i_k$$

If the communications system uses multiple UE groups with fixed resource allocation per group, then the controller determines the receive beamforming vectors by evaluating $$U_{i_k}^g \leftarrow (\Sigma_{(j,l)} H_{i_k j} V_{l_j}^g V_{l_j}^{g^H} H_{i_k j}^H + \sigma_{i_k}^2 I)^{-1} H_{i_k k} V_{i_k}^g, \forall i_k \in \mathcal{I}, \forall g \in \mathcal{G}$$

While if the communications system uses multiple UE groups with changeable resource allocations per group, then the controller determines the receive beamforming vectors by evaluating $$U_{i_k}^g \leftarrow (\Sigma_{(j,l)} H_{i_k j} V_{l_j}^g V_{l_j}^{g^H} H_{i_k j}^H + \sigma_{i_k}^2 I)^{-1} H_{i_k k} V_{i_k}^g, \forall i_k \in \mathcal{I}, \forall g \in \mathcal{G}$$

The controller may update the weighting vectors matrix (block 425). According to an example embodiment, the updating of the weighting vectors matrix may be based on a gradient map of the MSE matrix, $E_{i_k}$. As an example, if the communications system supports a single group of UEs, then the controller updates the weighting vectors matrix by evaluating $$W_{i_k} \leftarrow \nabla c_{i_k}(E_{i_k}), \forall i_k.$$

While if the communications system supports multiple UE groups with fixed resource allocation per group or with changeable resource allocation per group, then the controller update the weighting vectors matrix by evaluating $$W_{i_k}^g \leftarrow \nabla E_{i_k}^g c_{i_k}(\bullet), \forall i_k \in \mathcal{I}, \forall g \in \mathcal{G}.$$

The controller may determine transmit beamforming vectors (block 430). According to an example embodiment, the determination of the transmit beamforming vectors may be based on the channel response, the receive beamforming vectors (e.g., either the received beamforming vectors determined in block 420 or receive beamforming vectors determined in an earlier iteration in an iterative implementation of the block coordinate descent algorithm), noise (e.g., either from intra-cell transmissions or from inter-cell transmissions), and the like. According to an example embodiment, the controller may determine the transmit beamforming vectors for each of the scheduled UEs. As with the determination of the receive beamforming vectors, the determination of the transmit beamforming vectors may depend upon the parameters of the communications system. As an example, if the communications system supports a single group of UEs, then the controller determines the transmit beamforming vectors by evaluating $$V_{i_k} \leftarrow \left(\sum_{(j,l)} H_{j_l k}^H U_{l_j} W_{l_j} U_{l_j}^H H_{l_j k} + \mu_k^* I\right)^{-1} H_{i_k k}^H U_{i_k} W_{i_k}, \forall i_k.$$

If the communications system supports multiple UE groups with fixed resource allocation per group, then the controller determines the transmit beamforming vectors by evaluating $$V_{i_k}^g \leftarrow \left(\sum_{(j,l)} H_{l_j k}^H U_{l_j}^g W_{l_j}^{g^H} H_{l_j k} + \mu_k^* I\right)^{-1} H_{i_k k}^H U_{i_k}^g W_{i_k}^g, \forall i_k \in.$$

While if the communications system supports multiple UE groups with changeable resource allocations per group, then the controller determines the transmit beamforming vectors by evaluating $$V_{i_k}^g \leftarrow \left(\sum_{(j,l)} H_{l_j k}^H U_{l_j}^g W_{l_j}^g U_{l_j}^{g^H} H_{l_j k} + \mu_k^* I\right)^{-1} H_{i_k k}^H U_{i_k}^g W_{i_k}^g, \forall i_k \in.$$

In a scenario where the communications system supports multiple UE groups with changeable resource allocations per group, the controller may update UE resource allocations for each group (block 435). According to an example embodiment, the controller updates the UE resource allocations for each group by solving Expression (15) as previously presented.

If the controller is implementing an iterative version of the block coordinate descent algorithm, the controller may perform a check to determine if a convergence criterion has been met (block 440). As an example, the convergence criterion may be a number of iterations the block coordinate descent algorithm has been performed, an error rate of communications in the communications system, a data rate of the communications system, a change in consecutive resource allocations for a UE group, and the like.

If the convergence criterion has not been met, then the controller may return to block 420 to perform another iteration of the block coordinate descent algorithm. If the convergence criterion has been met, then the controller may signal the receive beamforming vectors to the UEs and signal the transmit beamforming vectors and information about the resource allocations to the eNBs (block 445). According to an example embodiment, if the controller is also an eNB, then the controller does not need to signal transmit beamforming vectors for its own served UEs to itself. According to an alternative example embodiment, the controller may not need to signal the receive beamforming vectors to the UEs since the UEs may be able to determine the receive beamforming vectors based on transmissions from their serving eNBs, for example, using pilot signals or other reference signals in the transmissions from their serving eNBs.

Although the discussion of the centralized implementation of the block coordinate descent algorithm provides details on initializing the transmit beamforming vectors, determining the receive beamforming vectors from the initialized transmit beamforming vectors, and determining the transmit beamforming vectors from the receive beamforming vectors, different orderings of the determination of the transmit beamforming vectors and/or the receive beamforming vectors are possible. As an example, an alternate centralized implementation of the block coordinate descent algorithm may begin with an initialization of the receive beamforming vectors, then determining the transmit beamforming vectors from the initialized receive beamforming vectors, and determining the receive beamforming vectors from the transmit beamforming vectors.

According to an example embodiment, the block coordinate descent algorithm may independently and simultaneously determine the transmit beamforming vectors, the receive beamforming vectors, and the weighting vectors matrix. Therefore, the block coordinate descent algorithm lends itself to a distributed implementation. Furthermore, since the block coordinate descent algorithm exhibits a fast convergence rate, a distributed implementation may incur low overhead.

Several assumptions about the knowledge of local channels may be made in the distributed implementation of the block coordinate descent algorithm: First, it is assumed that the channel state information is available locally at each eNB. That is, eNB k knows the local channel matrices $H_{l,k}$ to all UE $l_j$ in its own cell. According to an example embodiment, eNB k may have partial knowledge of the local channel matrices $H_{l,k}$. According to an alternative example embodiment, eNB k may use average values of the channel matrices instead of the actual channel values. In general, other statistical knowledge can be used in place of or in addition to the actual channel values in order to reduce overhead or to enhance performance. Second, it is assumed is that each UE has a feedback channel to send information (e.g., the updated receive beamforming vectors) to the other eNB. It is noted that these two assumptions are quite standard assumptions.

Figures 5A, 5B:
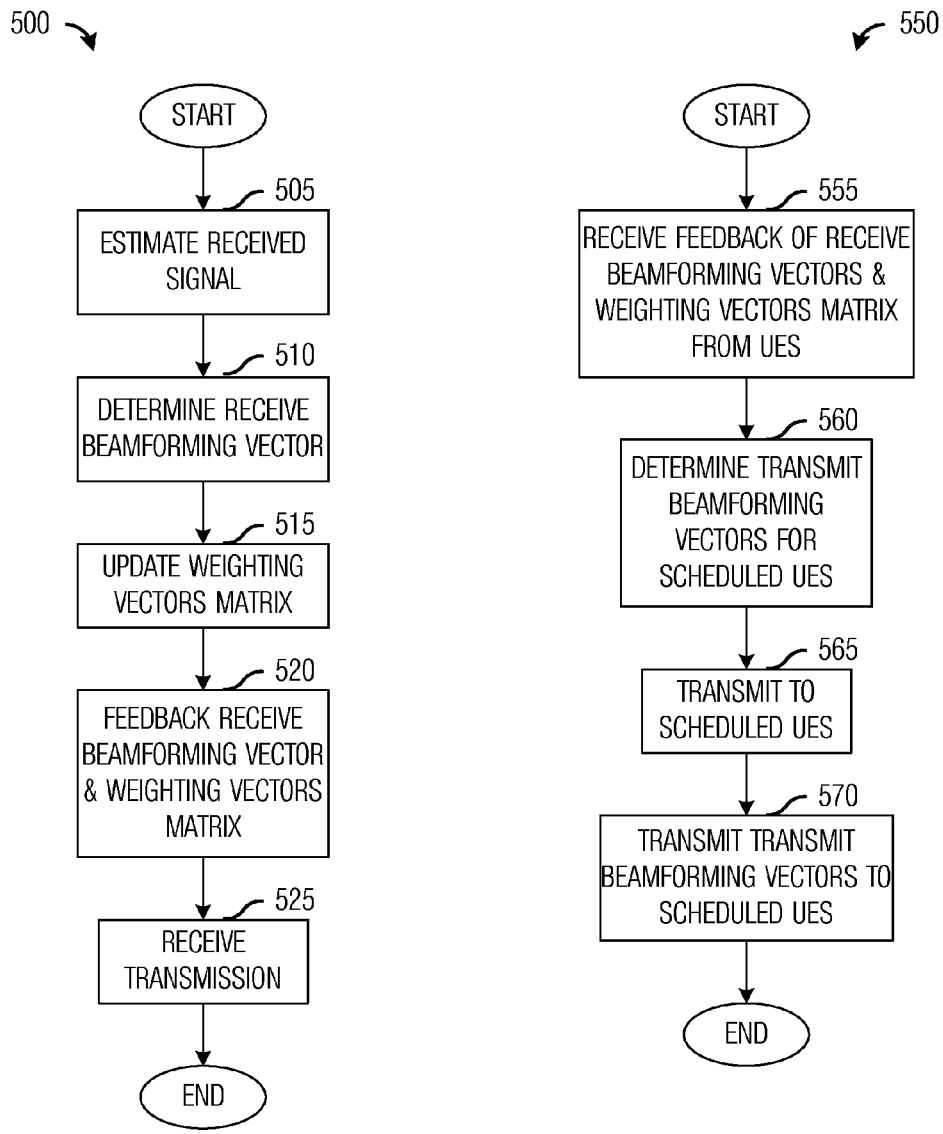
FIG. 5a illustrates an example flow diagram of operations in receiving a transmission from an eNB, wherein an algorithm to perform joint user grouping and beamforming vector design is implemented in a distributed manner according to example embodiments described herein.
FIG. 5b illustrates an example flow diagram of operations in transmitting to UEs, wherein an algorithm to perform joint user grouping and beamforming vector design is implemented in a distributed manner according to example embodiments described herein.

FIG. 5a illustrates a flow diagram of operations 500 in receiving a transmission from an eNB, wherein an algorithm to perform joint user grouping and beamforming vector design is implemented in a distributed manner. Operations 500 may be indicative of operations occurring in a UE served by an eNB of a communications system.

Operations 500 may begin with the UE estimating a received signal (block 505). According to an example embodiment, the UE estimates the received signal by measuring signals received at its antennas and then subtracting out signals intended for it, i.e., the UE determines a received signal covariance matrix $J_{i_k}$.

The UE may determine a receive beamforming vector based on its estimate of the received signal (block 510). According to an example embodiment, the UE also determines the receive beamforming vector from a previously determined received beamforming vector, i.e., the distributed implementation of the block coordinate descent algorithm is an iterative algorithm. How UE determines the receive beamforming vectors is based on parameters of the communications system.

The UE may update a weighting vectors matrix based on its receive beamforming vector (block 515). According to an example embodiment, the UE updates the weighting vectors matrix based on the parameters of the communication system.

The UE may feedback the receive beamforming vector and the weighting vectors matrix to its eNB as well as other eNBs in the communications system or eNBs operating within a specified proximity to the UE (block 520). In order to reduce the communication overhead, the UE only needs to feedback either an upper triangular part of matrix $U_{i_k} W_{i_k} U_{i_k}^H$ or a decomposition $\hat{U}_{i_k}$, where $\hat{U}_{i_k} \hat{U}_{i_k}^H = U_{i_k} W_{i_k} U_{i_k}^H$ (depending on a relative size of $N_{i_k}$ and $d_{i_k}$). The UE may receive a transmission from its eNB that is precoded with a transmit precoding vector determined based on the feedback provided by the UE (block 525).

According to an example embodiment, operations 500 may continue to operate in an iterative manner with an iteration potentially occurring in each transmitting and receiving cycle. According to an alternate example embodiment, once a convergence criterion for the block coordinate descent algorithm has been met, a frequency of iterations of the algorithm may be decreased to help reduce computational and communications overhead.

FIG. 5b illustrates a flow diagram of operations 550 in transmitting to UEs, wherein an algorithm to perform joint user grouping and beamforming vector design is implemented in a distributed manner. Operations 550 may be indicative of operations occurring in a communications controller, such as an eNB, of a communications system.

Operations 550 may begin with the eNB receiving feedback information from UEs (block 555). According to an example embodiment, the eNB receives from each of the UEs (or a subset of the UEs) that it is serving, a receive beamforming vector and a weighting vectors matrix, or a reduced representation thereof. If the eNB does not receive feedback information from all of its UEs, the eNB may be able to utilize an averaging of values or historic information to infer the feedback information from the UEs not reporting feedback information. Additionally, the eNB receives the feedback information from each UE operating in its cell and from a subset of other UEs operating in the communications system.

According to an example embodiment, rather than receiving feedback information from all of the UEs that it is serving, the eNB may receive feedback information from the UEs that are causing the greatest interference. The UEs creating the greatest interference may be selected based on an interference threshold or a number threshold (e.g., the five highest interfering UEs).

The eNB may determine transmit beamforming vectors for UEs operating in its cell based on the feedback information (block 560). The eNB may transmit to the UEs operating in its cell utilizing the transmit beamforming vectors (block 565). The eNB may also transmit the transmit beamforming vectors to the UEs (block 570). According to an example embodiment, the eNB provides the transmit beamforming vectors to its served UEs as well as UEs that it does not serve. According to an example embodiment, the eNB provides the transmit beamforming vectors to its served UEs as well as a subset of UEs that it does not serve, e.g., UEs that are operating in close proximity to the eNB.

According to an example embodiment, operations 500 may continue to operate in an iterative manner with an iteration potentially occurring in each transmitting and receiving cycle. According to an alternate example embodiment, once a convergence criterion for the block coordinate descent algorithm has been met, a frequency of iterations of the algorithm may be decreased to help reduce computational and communications overhead.

Figure 6:
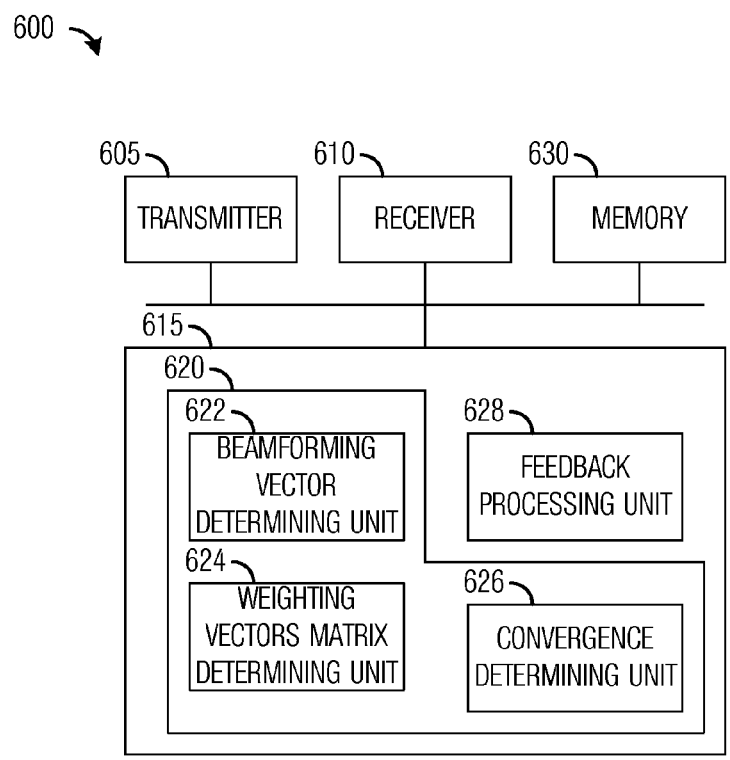
FIG. 6 illustrates an example first communications device according to example embodiments described herein.

FIG. 6 illustrates a first communications device 600. Communications device 600 may be an implementation of a controller, such as controller 375 of FIG. 3b. Communications device 600 may be used to implement various ones of the embodiments discussed herein. As shown in FIG. 6, a transmitter 605 is configured to send packets and a receiver 610 is configured to receive packets. Transmitter 605 and receiver 610 may have a wireless interface, a wireline interface, or a combination thereof.

A cost function processing unit 620 is configured to optimize a cost function to determine transmit beamforming vectors and/or receive beamforming vectors for use in MIMO communications, as well as schedule UEs. Cost function processing unit 620 optimizes the cost function using an iterative or non-iterative block coordinate descent algorithm. A beamforming vector determining unit 622 is configured to determine the transmit beamforming vectors and/or the receive beamforming vectors according to the channel response, the transmit beamforming vectors (e.g., either the initialized transmit beamforming vectors or transmit beamforming vectors determined in an earlier iteration in an iterative implementation of the block coordinate descent algorithm), noise (e.g., either from intra-cell transmissions or from inter-cell transmissions), and the like. A weighting vectors matrix determining unit 624 is configured to update the weighting vectors matrix based on a gradient map of an MSE matrix.

If cost function processing unit 620 is utilizing an iterative block coordinate descent algorithm to optimize the cost function, a convergence determining unit 626 is configured to determine if a convergence criterion has been met. If the convergence criterion has been met, then the optimization of the cost function ends, while if the convergence criterion has not been met, cost function unit 620 performs an additional iteration. A feedback processing unit 628 is configured to process feedback information, such as received signal information from UEs served by eNBs that are in turn served by communications device 600, as well as UEs not served by eNBs that are served by communications device 600. A memory 630 is configured to store the beamforming vectors, the weighting vectors matrix, feedback information, intermediate variables, and the like.

The elements of communications device 600 may be implemented as specific hardware logic blocks. In an alternative, the elements of communications device 600 may be implemented as software executing in a processor, controller, application specific integrated circuit, and the like. In yet another alternative, the elements of communications device 600 may be implemented as a combination of software and/or hardware.

As an example, transmitter 605 and receiver 610 may be implemented as a specific hardware block, while cost function processing unit 620, beamforming vector determining unit 622, weighting vectors matrix determining unit 624, convergence determining unit 626, and feedback processing unit 628 may be software modules executing in a processor 615, a microprocessor, a custom circuit, or a custom compiled logic array of a field programmable logic array.

Figure 7:
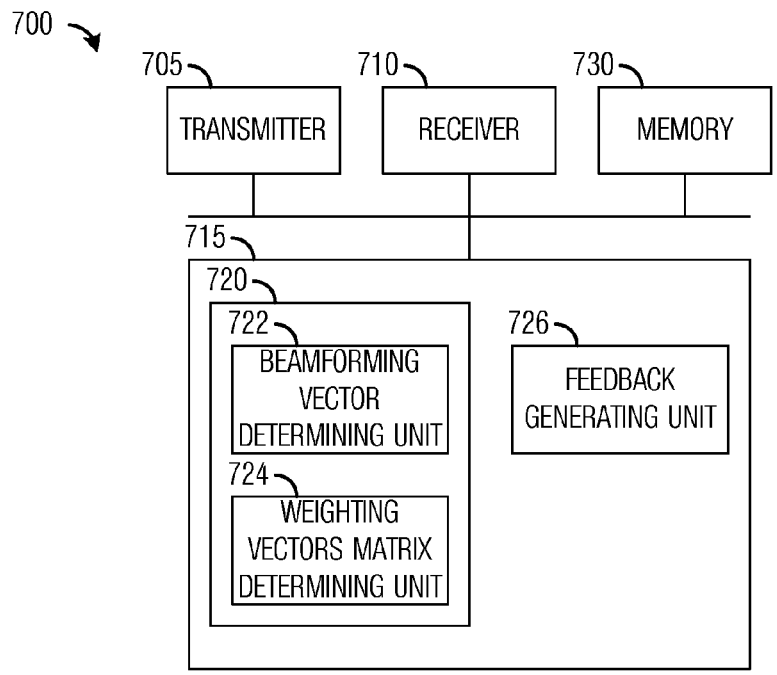
FIG. 7 illustrates an example second communications device according to example embodiments described herein.

FIG. 7 illustrates a second communications device 700. Communications device 700 may be an implementation of a UE, such as UE 365 of FIG. 3b. Communications device 700 may be used to implement various ones of the embodiments discussed herein. As shown in FIG. 7, a transmitter 705 is configured to send packets and a receiver 710 is configured to receive packets. Transmitter 705 and receiver 710 may have a wireless interface, a wireline interface, or a combination thereof.

A cost function processing unit 720 is configured to determine receive beamforming vectors for use in MIMO communications. A beamforming vector determining unit 722 is configured to determine the receive beamforming vectors according to the channel response, the transmit beamforming vectors (e.g., either the initialized transmit beamforming vectors or transmit beamforming vectors determined in an earlier iteration in an iterative implementation of the block coordinate descent algorithm), noise (e.g., either from intra-cell transmissions or from inter-cell transmissions), and the like. A weighting vectors matrix determining unit 724 is configured to update the weighting vectors matrix based on a gradient map of an MSE matrix.

A feedback generating unit 726 is configured to generate feedback information, such as the receive beamforming vectors and the weighting vectors matrix. A memory 730 is configured to store the beamforming vectors, the weighting vectors matrix, feedback information, intermediate variables, and the like.

The elements of communications device 700 may be implemented as specific hardware logic blocks. In an alternative, the elements of communications device 700 may be implemented as software executing in a processor, controller, application specific integrated circuit, and the like. In yet another alternative, the elements of communications device 700 may be implemented as a combination of software and/or hardware.

As an example, transmitter 705 and receiver 710 may be implemented as a specific hardware block, while cost function processing unit 720, beamforming vector determining unit 722, weighting vectors matrix determining unit 724, and feedback processing unit 726 may be software modules executing in a processor 715, a microprocessor, a custom circuit, or a custom compiled logic array of a field programmable logic array.

Figure 8:
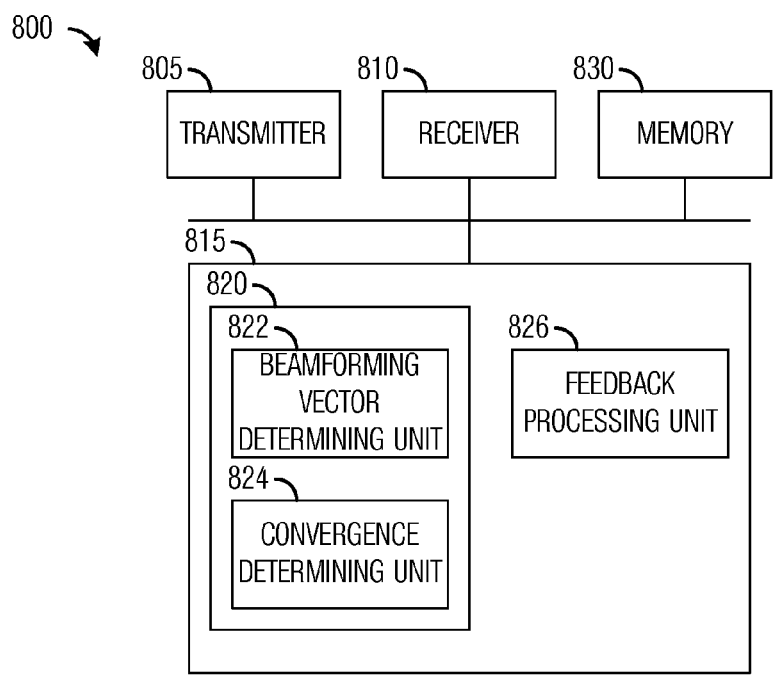
FIG. 8 illustrates an example third communications device according to example embodiments described herein.

FIG. 8 illustrates a third communications device 800. Communications device 800 may be an implementation of an eNB, such as eNB 355 of FIG. 3b. Communications device 800 may be used to implement various ones of the embodiments discussed herein. As shown in FIG. 8, a transmitter 805 is configured to send packets and a receiver 810 is configured to receive packets. Transmitter 805 and receiver 810 may have a wireless interface, a wireline interface, or a combination thereof.

A cost function processing unit 820 is configured to optimize a cost function to determine transmit beamforming vectors for use in MIMO communications, as well as schedule UEs. Cost function processing unit 820 optimizes the cost function using an iterative or non-iterative block coordinate descent algorithm. A beamforming vector determining unit 822 is configured to determine the transmit beamforming vectors according to the channel response, the transmit beamforming vectors (e.g., either the initialized transmit beamforming vectors or transmit beamforming vectors determined in an earlier iteration in an iterative implementation of the block coordinate descent algorithm), noise (e.g., either from intra-cell transmissions or from inter-cell transmissions), and the like.

If cost function processing unit 820 is utilizing an iterative block coordinate descent algorithm to optimize the cost function, a convergence determining unit 824 is configured to determine if a convergence criterion has been met. If the convergence criterion has been met, then the optimization of the cost function ends, while if the convergence criterion has not been met, cost function unit 820 performs an additional iteration. A feedback processing unit 826 is configured to process feedback information, such as receive beamforming vectors and weighting vectors matrices from UEs served by communications device 800, as well as UEs not served by communications device 800. A memory 830 is configured to store the beamforming vectors, the weighting vectors matrix, feedback information, intermediate variables, and the like.

The elements of communications device 800 may be implemented as specific hardware logic blocks. In an alternative, the elements of communications device 800 may be implemented as software executing in a processor, controller, application specific integrated circuit, and the like. In yet another alternative, the elements of communications device 800 may be implemented as a combination of software and/or hardware.

As an example, transmitter 805 and receiver 810 may be implemented as a specific hardware block, while cost function processing unit 820, beamforming vector determining unit 622, convergence determining unit 824, and feedback processing unit 826 may be software modules executing in a processor 815, a microprocessor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a controller of a multiple input, multiple output communications system, the method comprising:
    formulating an objective function according to a resource allocation for a user equipment (UE) and a mean square error expression;
    updating the objective function to generate an updated resource allocation for the UE, a transmit beamforming vector to precode a transmission to the UE, and a receive beamforming vector to adjust a receiver to receive the precoded transmission; and
    transmitting allocation information about the updated resource allocation for the UE and the transmit beamforming vector to a communications controller serving the UE.

2. The method of claim 1, wherein the updating the objective function comprises evaluating $$\min_{U,V,B} \sum_{k=1}^{K} \sum_{i=1}^{I_k} c_{i_k}(\beta, E_{i_k})$$

$$\text{s.t.} \sum_{i=1}^{I_k} Tr\left(V_{i_k}^g V_{i_k}^{gH}\right) \leq P_k, \forall k \in K, \forall g \in \mathcal{G}$$

$$\sum_{g=1}^{G} \beta_g = 1$$

$$\beta_g \geq 0, \forall g \in \mathcal{G},$$

where $c_{i_k}(\beta, E_{i_k})$ is the objective function, $E_{i_k}$ is the mean square error expression of a data vector intended for the UE as received by the UE, $V_{i_k}^g$ is a matrix of transmit beamforming vectors for UE $i_k$ of group g, $\beta_g$ is a resource allocation for UE group g, G is a number of UE groups, $P_k$ is a transmit power of communications controller k, $(\cdot)^H$ is a complex conjugate transpose operator, and $Tr(\cdot)$ is a trace operator.

3. The method of claim 2, wherein the evaluating comprises utilizing a block coordinate descent algorithm.

4. The method of claim 2, wherein the evaluating comprises
    determining the receive beamforming vector according to a previous value of the transmit beamforming vector;
    updating a weighting matrix; and
    determining the transmit beamforming vector according to the receive beamforming vector and the updated weighting matrix.

5. The method of claim 4, wherein the determining the receive beamforming vector comprises evaluating $$U_{i_k}^g \leftarrow (\Sigma_{(j,l)} H_{i_k j} V_{l_j}^g V_{l_j}^{gH} H_{i_k j}^H + \sigma_{i_k}^2 I)^{-1} H_{i_k k} V_{i_k}^g,$$
$$\forall i_k \in \mathcal{I}, \forall g \in \mathcal{G},$$

where $V_{l_j}^g$ is the previous value of the transmit beamforming vector, $H_{xy}$ is a channel response from transmitter y to receiver x, I is an identity matrix, $\sigma_{i_k}^2$ is a receiver noise power for user i at cell k, G is the number of UE groups, and $(\cdot)^H$ is the complex conjugate transpose operator.

6. The method of claim 4, wherein the updating the weighting matrix comprises evaluating $$W_{i_k}^g \leftarrow \nabla E_{i_k}^g c_{i_k}(\cdot), \forall i_k \in \mathcal{I}, \forall g \in \mathcal{G},$$

where $c_{i_k}(\cdot)$ is the objective function, $E_{i_k}^g$ is a mean square error form of a received signal at UE $i_k$ in UE group g, G is the number of UE groups, and $\Delta(\cdot)$ is a gradient map operator.

7. The method of claim 4, wherein the determining the transmit beamforming vector comprises evaluating $$V_{i_k}^g \leftarrow \left(\sum_{(j,l)} H_{l_j k}^H U_{l_j}^g W_{l_j}^g U_{l_j}^{gH} H_{l_j k} + \mu_k^* I\right)^{-1} H_{i_k k}^H U_{i_k}^g W_{i_k}^g, \forall i_k \in \mathcal{I}, \forall g \in \mathcal{G},$$

where $U_{l_j}^g$ is the receive beamforming vector, $H_{xy}$ is a channel response from transmitter y to receiver x, I is an identity matrix, $\mu_k^*$ is an optimal Lagrangian multiplier corresponding to a power budget constraint at cell k, G is the number of UE groups, and $(\cdot)^H$ is the complex conjugate transpose operator.

8. The method of claim 4, wherein the evaluating further comprises updating the resource allocation for the UE.

9. The method of claim 8, wherein the updating the resource allocation for the UE comprises evaluating $$\min_{\beta} \sum_{k=1}^{K} \sum_{i=1}^{l_k} c_{i_k}(\beta, E_{i_k})$$

$$\text{s.t.} \sum_{g=1}^{G} \beta_g = 1$$

$$\beta_g \geq 0, \forall g \in \mathcal{G}.$$

where $c_{i_k}(\beta, E_{i_k})$ is the objective function, $E_{i_k}$ is the mean square error expression of the data vector intended for the UE as received by the UE, $\beta_g$ is a resource allocation for UE group g, and G is the number of UE groups.

10. The method of claim 4, further comprising repeating the determining the receive beamforming vector, the updating the weighting matrix, and the determining the transmit beamforming vector until a convergence criterion is met.

11. The method of claim 1, further comprising transmitting the receive beamforming vector to the UE.

12. The method of claim 1, wherein the updating the objective function comprises finding a globally optimal solution of the objective function.

13. The method of claim 1, wherein the updating the objective function comprises finding a locally optimal solution of the objective function.

14. A controller comprising:
a processor configured to formulate an objective function according to a resource allocation for a user equipment (UE) and a mean square error expression, and to update the objective function to generate an updated resource allocation for the UE, a transmit beamforming vector to precode a transmission to the UE, and a receive beamforming vector to adjust a receiver to receive the precoded transmission; and
a transmitter operatively coupled to the processor, the transmitter configured to transmit allocation information about the updated resource allocation for the UE and the transmit beamforming vector to a communications controller serving the UE.

15. The controller of claim 14, wherein the transmitter is configured to transmit the receive beamforming vector to the UE.

16. The controller of claim 14, wherein the processor is configured to evaluate $$\min_{U,V,\beta} \sum_{k=1}^{K} \sum_{i=1}^{l_k} c_{i_k}(\beta, E_{i_k})$$

$$\text{s.t.} \sum_{i=1}^{l_k} Tr(V_{i_k}^g V_{i_k}^{gH}) \leq P_k, \forall k \in K, \forall g \in \mathcal{G}$$

$$\sum_{g=1}^{G} \beta_g = 1$$

$$\beta_g \geq 0, \forall g \in \mathcal{G},$$

where $c_{ik}(\beta, E_{ik})$ is the objective function, $E_{ik}$ is the mean square error expression of a data vector intended for the UE as received by the UE, $V_{i_k}^g$ is a matrix of transmit beamforming vectors for UE $i_k$ of group g, $\beta_g$ is a resource allocation for UE group g, G is a number of UE groups, $P_k$ is a transmit power of communications controller k, $(\cdot)^H$ is a complex conjugate transpose operator, and $Tr(\cdot)$ is a trace operator.

17. The controller of claim 16, wherein the processor is configured to determine the receive beamforming vector according to a previous value of the transmit beamforming vector, to update a weighting matrix, and to determine the transmit beamforming vector according to the receive beamforming vector and the updated weighting matrix.

18. The controller of claim 17, wherein the processor is configured to update the resource allocation for the UE.

19. The controller of claim 18, wherein the processor configured to update the resource allocation for the UE comprises the processor configured to evaluate $$\min_{\beta} \sum_{k=1}^{K} \sum_{i=1}^{l_k} c_{i_k}(\beta, E_{i_k})$$

$$\text{s.t.} \sum_{g=1}^{G} \beta_g = 1$$

$$\beta_g \geq 0, \forall g \in G,$$

where $c_{i_k}(\beta, E_{i_k})$ is the objective function, $E_{i_k}$ is the mean square error expression of the data vector intended for the UE as received by the UE, $\beta_g$ is a resource allocation for UE group g, and G is the number of UE groups.

20. The controller of claim 17, wherein the processor configured to determine the receive beamforming vector comprises the processor configured to evaluate $$U_{i_k}^g \leftarrow (\Sigma_{(j,l)} H_{i_kj} V_{l_j}^g V_{l_j}^{gH} H_{i_kj}^H + \sigma_{i_k}^2 I)^{-1} H_{i_kk} V_{i_k}^g, \forall i_k \in \mathcal{I}, \forall g \in \mathcal{G},$$

where $V_{l_j}^g$ is the previous value of the transmit beamforming vector, $H_{xy}$ is a channel response from transmitter y to receiver x, I is an identity matrix, $\sigma_{ik}^2$ is a receiver noise power for user i at cell k, G is the number of UE groups, and $(\cdot)^H$ is the complex conjugate transpose operator.

21. The controller of claim 17, wherein the processor configured to update the weighting matrix comprises the processor configured to evaluate $$W_{i_k}^g \leftarrow \Delta E_{i_k}^g c_{i_k}(\cdot), \forall i_k \in \mathcal{I}, \forall g \in \mathcal{G},$$

where $c_{i_k}(\cdot)$ is the objective function, $E_{i_k}^g$ is a mean square error form of a received signal at UE $i_k$ in UE group g, G is the number of UE groups, and $\Delta(\cdot)$ is a gradient map operator.

22. The controller of claim 17, wherein the processor configured to determine the transmit beamforming vector comprises the processor configured to evaluate $$V_{i_k}^g \leftarrow \left( \sum_{(j,l), \forall g \in G} H_{i_kj}^H U_{l_j}^g W_{l_j}^g U_{l_j}^{gH} H_{l_jk} + \mu_k^* I \right)^{-1} H_{i_kk}^H U_{i_k}^g W_{i_k}^g, \forall i_k \in,$$

where $U_{l_j}^g$ is the receive beamforming vector, $H_{xy}$ is a channel response from transmitter y to receiver x, I is an identity matrix, $\mu_k^*$ is an optimal Lagrangian multiplier corresponding to a power budget constraint at cell k, G is the number of UE groups, and $(\cdot)^H$ is the complex conjugate transpose operator.

23. The controller of claim 17, wherein the processor is further configured to repeat the determine the receive beamforming vector, the update the weighting matrix, and the determine the transmit beamforming vector until a convergence criterion is met.

24. The controller of claim 16, wherein the processor configured to evaluate comprises the processor configured to utilize a block coordinate descent algorithm.

25. The controller of claim 14, wherein the processor configured to update the objective function comprises the processor configured to find a globally optimal solution of the objective function.

26. The controller of claim 14, wherein the processor configured to update the objective function comprises the processor configured to find a locally optimal solution of the objective function.

* * * * *

UNITED STATES PATENT AND TRADEMARK OFFICE
CERTIFICATE OF CORRECTION

PATENT NO. : 8,797,959 B2
APPLICATION NO. : 13/342769
DATED : August 5, 2014
INVENTOR(S) : Meisam Razaviyayn et al.

It is certified that error appears in the above-identified patent and that said Letters Patent is hereby corrected as shown below:

In the Specification

In Col. 8, line 20, Detailed Description of Illustrative Embodiments, immediately after "increasing function of" insert -- $R_{i_k}$, --.

In Col. 8, lines 40-41, Detailed Description of Illustrative Embodiments, delete " $\max_{V,U,W} \sum_{k=1}^{K} \sum_{i=1}^{I_k} (Tr(W_{i_k}^H E_{i_k}) + c_{i_k}(\gamma_{i_k}(W_{i_k})) - Tr(W_{i_k}^H \gamma_{i_k}(W_{i_k})))$ " and insert -- $\min_{V,U,W} \sum_{k=1}^{K} \sum_{i=1}^{I_k} (Tr(W_{i_k}^H E_{i_k}) + c_{i_k}(\gamma_{i_k}(W_{i_k})) - Tr(W_{i_k}^H \gamma_{i_k}(W_{i_k})))$ --.

In Col. 8, line 47, Detailed Description of Illustrative Embodiments, delete

" $\gamma_{i_k}(\bullet): \mathbb{R}^{d_{i_k} \times d_{i_k}}, \mathbb{R} \mapsto^{d_{i_k} \times d_{i_k}}$ " and insert -- $\gamma_{i_k}(\bullet): \mathbb{R}^{d_{i_k} \times d_{i_k}} \mapsto \mathbb{R}^{d_{i_k} \times d_{i_k}}$ --.

In Col. 12, lines 1-2, Detailed Description of Illustrative Embodiments, delete

" $V_{i_k}^g \Delta (\Sigma_{(j,l)} H_{l,k}^H U_{l,j}^g W_{l,j}^g U_{l,j}^{gH} H_{l,k} + \mu *_k I)^{-1} H_{i_k,k}^H U_{i_k}^g - W_{i_k}^g, \forall i_k \in I, \forall g \in \mathcal{G}$ " and insert -- $V_{i_k}^g \leftarrow (\Sigma_{(j,l)} H_{l,k}^H U_{l,j}^g W_{l,j}^g U_{l,j}^{gH} H_{l,k} + \mu_k^* I)^{-1} H_{i_k,k}^H U_{i_k}^g W_{i_k}^g, \forall i_k \in I, \forall g \in \mathcal{G}$ --.

In Col. 12, lines 30-33, Detailed Description of Illustrative Embodiments, delete " $s.t. \sum_{i=1}^{I_k} Tr(V_{i_k}^g V_{i_k}^g) \leq P_k, \forall k \in K, \forall g \in \mathcal{G}$ " and insert -- $s.t. \sum_{i=1}^{I_k} Tr(V_{i_k}^g V_{i_k}^{gH}) \leq P_k, \forall k \in K, \forall g \in \mathcal{G}$ --.

In the Claims

In Col. 22, line 51, claim 6, delete "$\Delta(\bullet)$" and insert -- $\nabla(\bullet)$ --.
In Col. 24, lines 33-34, claim 20, delete " $U_{i_k}^g \leftarrow (\Sigma_{(j,l)} H_{i_k,j} V_{l,j}^{g^V} V_{l,j}^{gH} H_{i_k,j}^{H+\sigma_{i_k}^2} I)^{-1} H_{i_k,k} V_{i_k}^g, \forall i_k \in I, \forall g \in \mathcal{G}$ " and insert -- $U_{i_k}^g \leftarrow (\Sigma_{(j,l)} H_{i_k,j} V_{l,j}^g V_{l,j}^{gH} H_{i_k,j}^H + \sigma_{i_k}^2 I)^{-1} H_{i_k,k} V_{i_k}^g, \forall i_k \in I, \forall g \in \mathcal{G}$ --.

Signed and Sealed this
Twenty-fifth Day of November, 2014

Michelle K. Lee
*Deputy Director of the United States Patent and Trademark Office*

CERTIFICATE OF CORRECTION (continued)
U.S. Pat. No. 8,797,959 B2

In Col. 24, line 44, claim 21, delete "$w_{i_k}^g \leftarrow \Delta E_{i_k}^g c_{i_k}(\bullet), \forall_{i_k} \in I, \forall g \in \mathcal{G},$" and insert -- $w_{i_k}^g \leftarrow \nabla E_{i_k}^g c_{i_k}(\bullet), \forall_{i_k} \in I, \forall g \in \mathcal{G},$ --.

In Col. 24, line 47, claim 21, delete "$\Delta(\bullet)$" and insert -- $\nabla(\bullet)$ --.